United States Patent [19]

Jean et al.

[11] 4,099,042
[45] Jul. 4, 1978

[54] APPLICATOR FOR APPLYING MICROWAVES

[76] Inventors: Olivier A. Jean, 12 avenue Lavoisier, 78600 Maisons Laffitte, France; Georges Roussy, 17, rue Ernest Renan, 54520 Laxou, both of France

[21] Appl. No.: 699,311

[22] Filed: Jun. 24, 1976

[30] Foreign Application Priority Data

Jul. 4, 1975 [FR] France .................. 75 21065

[51] Int. Cl.² .............................................. H05B 9/06
[52] U.S. Cl. ...................... 219/10.55 A; 219/10.55 F; 333/98 R
[58] Field of Search ................. 219/10.55 A, 10.55 F, 219/10.55 M; 333/10, 83 R

[56] References Cited

U.S. PATENT DOCUMENTS

| | | | |
|---|---|---|---|
| 2,520,602 | 8/1950 | Linder | 219/10.55 M |
| 2,761,942 | 9/1956 | Hall | 219/10.55 F |
| 3,218,429 | 11/1965 | Lenart | 219/10.55 F |
| 3,300,615 | 1/1967 | Smith | 219/10.55 F |
| 3,436,506 | 3/1969 | Smith | 219/10.55 F |
| 3,462,704 | 8/1969 | Golombek et al. | 219/10.55 F |
| 3,745,292 | 7/1973 | Couasnard | 219/10.55 A |
| 3,761,665 | 9/1973 | Nagao et al. | 219/10.55 A |
| 3,783,221 | 1/1974 | Soulier | 219/10.55 A |

FOREIGN PATENT DOCUMENTS

| | | | |
|---|---|---|---|
| 1,186,570 | 10/1958 | Fed. Rep. of Germany | 219/10.55A |
| 830,116 | 3/1960 | United Kingdom | 219/10.55 |

*Primary Examiner*—J. V. Truhe
*Assistant Examiner*—Bernard Roskoski
*Attorney, Agent, or Firm*—Flynn & Frishauf

[57] ABSTRACT

An applicator comprising a generator of microwaves, said microwaves having a mode of propagation and a wavelength, an enclosure for receiving material to be treated, a coupler coupling the generator and the enclosure so that the generator delivers microwave energy distributed in resonance for said mode of propagation in a given direction, a first short-circuit device situated at one end of said enclosure with respect to said direction, a device for displacing the first short-circuit device by a reciprocating movement in said direction, and means for maintaining the resonance in spite of the displacements of the first short-circuit device.

2 Claims, 2 Drawing Figures

APPLICATOR FOR APPLYING MICROWAVES

BACKGROUND AND PRIOR ART

The invention relates to applicators for applying microwaves to a material and for subjecting a material at least one of whose main components is a dielectric, particularly in the solid of liquid phase, to microwaves so as to impart to the material microwaves energy.

An applicator comprises essentially a waveguide whose inlet is coupled to a generator of microwaves. The waveguide also seres as a receptacle for the material being treated, or contains a receptacle. If the material is a solid, the body of material can itself have an inlet face through which penetrate the waves produced by the generator. On the other hand, if the material is a fluid, or for example is in the form of solid spherules, the inlet face is defined by the face of the receptacle which contains the material.

The yield of the apparatus, that is to say the ratio of the energy consumed in the waveguide to the energy supplied, is itself of great importance, but is also important because if too much energy is lost it is necessary to provide costly devices for absorbing the lost energy issuing from the outlet face of the material. To increase the yield it is possible, in principle, to use a very long waveguide. But this costly solution is sometimes quite impossible in practice. In particular, if the angle of loss of the dielectric, that is to say its tangent, is less than 0.05, the length of the reactor becomes inpracticable. It has been proposed to reflect a portion of the incident wave from the generator, after it has passed through the material in the waveguide and issues from the outlet face of the material as the outlet wave. It has also been proposed to reflect the wave leaving the inlet face of the material (this wave would otherwise return to the generator), reflecting the wave back into the applicator. For this purpose one can use a mirror or reflecting surface, that is to say an electrical conductor which forms a short circuit at hyper frequencies, the mirror being positioned at the outlet end of the waveguide or enclosure. A mirror of this kind usually takes the form of a metal plate or metal window installed at the outlet end of the waveguide or in an extension of the waveguide.

But this method for recovering energy which is not consumed in the applicator runs into certain difficulties.

The wave, which has passed once through the material and then been reflected from the other end, and has then passed through the material again but in the opposite direction, and has then been reflected again at the inlet end of the applicator by the coupling device, adds itself, in amplitude and phase, to the wave entering the applicator for the first time. The reflected wave has to reinforce the incident wave, rather than weakening it. This determines the length of the enclosure as a function of the wavelength emitted by the generator, the geometrical dimensions of the material being treated and its permitivity. The receptacle is therefore a unimode resonant cavity in the direction of the waveguide. The present invention utilizes this fact in homogenizing the treatment applied to the material.

A second difficulty, in recuperating the energy which is not consumed in the applicator, arises in that the coupling factor of the resonator, or enclosure, must be correctly chosen. The portion of the energy which penetrates into the applicator is exactly the same as the portion which issues from the applicator after each passage through it, the corresponding circuit being reciprocal. If the coupling aperture is too small, the small quantity of energy which penetrates into the resonator is reflected several times inside the resonator and not much leaves. But the yield of the applicator is low, because a great amount of energy is reflected by the inlet. On the other hand, if the coupling aperture is too large, the resonance is weekened by the energy lost through the aperture after each passage. The best coupling factor has to be found, so that the energy reflected by the aperture is exactly compensated by the energy which escapes from the resonator. Under these circumstances all the power delivered by the generator is consumed in the applicator. The matter can be expressed by saying that the length of the applicator is multiplied by a factor, called the resonance rise Q (which is also a measure of the ratio of the power stored to the power dissipated), and it can be said that a system of high stationary waves creates itself in the interior of the resonator.

But this system of stationary waves can be very inconvenient. In certain regions of the material, where the amplitude of the electromagnetic field reaches its peak, the material can be damaged. In other regions, a quarter of a wavelength away from the first regions, in the material or in the waveguide ($\frac{1}{4}$ g), the amplitude is minimal. In these regions the material is insufficiently treated. This heterogeneity of effect reduces the usefullness of the applicator.

SUBJECT MATTER OF THE INVENTION

In the present invention this difficulty is remedied by displacing the system of stationary waves, relative to the material, by a reciprocating movement, the system of waves itself remaining unchanged during this movement. In other words, the system of stationary waves is not itself modified by the reciporcations. All that happens is that the system of stationary waves is displaced, moving back and forth in its longitudinal direction through a distance at least $\frac{1}{4}$ of the wavelength in the material.

It is preferable to move the system of stationary waves as a whole, rather than merely agitating the material, which is only possible if the material is a fluid. Agitation of a fluid is never homogeneous in character and consequently there is little movement in certain regions, in particular streaks occur in the fluid which remain stationary relative to the system of waves.

Moreover, it is better to displace the system of stationary waves, rather than moving the material in the waveguide, in the first place because the material often has to be treated for long periods of time, or treated repeatedly. Or the material is associated with a support which has to remain in the waveguide, for example a molecular screen over which reagents have to flow through the waveguide.

A further disadvantage of moving the material is that the material being treated is often cumbersome to manipulate and to do this it is necessary to use disturbing devices which penetrate into the waveguide. Thus it is usually best to displace the system of stationary waves, leaving the material itself stationary. Nevertheless, it is possible to move the material, or even to move both the material and the system of stationary waves.

An applicator according to the invention comprises a generator of microwaves coupled by a coupler to an enclosure into which the generator delivers microwave energy distributed in resonance, the state of resonance coresponding to putting into resonance a mode of propagation of the microwaves in a given direction, and a short-circuit device situated at one end of the enclosure with respect to this direction.

The applicator also contains a device for displacing the short-circuit device by a reciprocating movement in this direction, and means for maintaining the resonance in spite of these displacements.

Each back and forth movement results in a variation of phase between the waves, which could spoil the resonance, were the effect not remedied. For this purpose the means for maintaining resonance consists of another short-circuit device situated at the other end of the enclosure, the device for displacing the first short-circuit device simultaneously displacing the second short-circuit device in the same direction and over the same distance. The device for displacing the short-circuit devices preferably has a mechanical connection between the two short-circuit devices, and a mechanism for adjusting the distance between the two short-circuit devices, for adapting the applicator to different wavelengths.

The means for maintaining resonance can if desired take the form of a conventional impedance correcting circuit, or of a diaphragm or screw whose position ensures that resonance is maintained and which has an opening or recess for adjusting the coupling factor.

On the other hand, if desired, the means for maintaining resonance can consist of a phase shifter of the directional 3 db coupler type, with two pistons or short-circuit devices. One of the branches is coupled to the generator for microwaves, the conjugated branch being coupled to the enclosure. The other two branches contain short-circuit devices staggered in position by a quarter of a wavelength.

The two short-circuit devices are displaced together, and simultaneously with the short-circuit device positioned at the outlet of the enclosure, and through the same distance. The three short-circuit devices are preferably fixed rigidly to each other.

By another feature of the invention easy and continuous access allowing fluid to flow into the interior of the waveguide or enclosure is obtained in that the short-circuit devices occupy only a portion of the cross section of the waveguide, preferably that portion where the field is most intense, for example where the field is 80% of the total field. The invention therefore also includes an applicator comprising a waveguide coupled to a generator of microwaves and a short-circuit device positioned in the guide, the applicator being characterized in that the waveguide is connected to a source of fluid and the short-circuit device occupies only a portion of the cross section of the waveguide.

The drawing, which is given merely to provide an example, shows:

Figure 1:
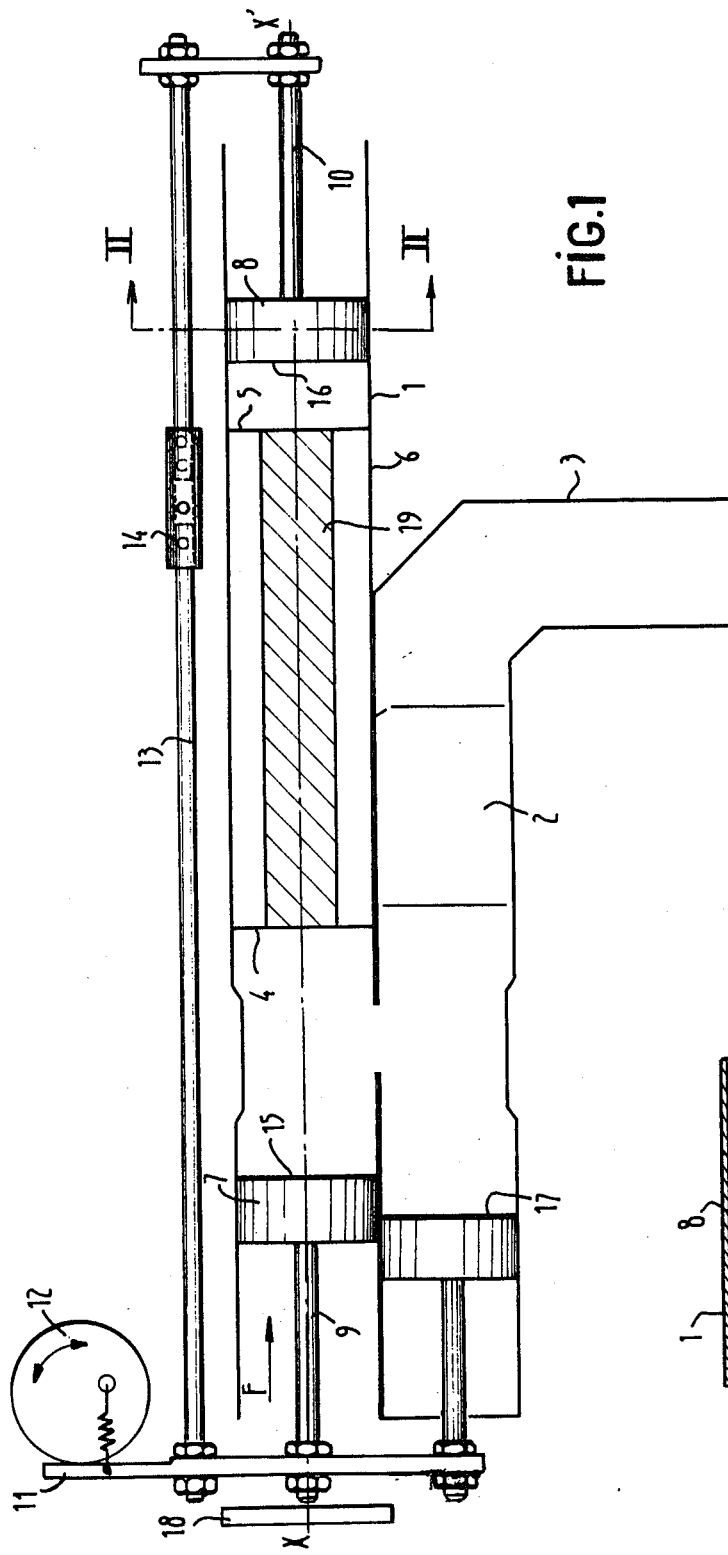
FIG. 1 is a diagrammatical longitudinal section through the waveguide of a applicator according to the invention.
Figure 2:
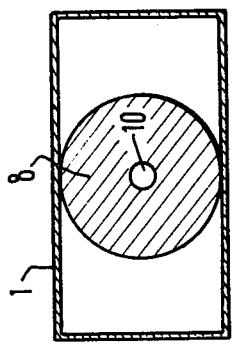
FIG. 2 is a cross section taken in the plane II—II of FIG. 1.

The applicator has a frame, not shown, supporting a tube 1 made of an electrical material. The tube is a waveguide. The tube is connected to a magnetron 3 which emits electromagnetic waves through an impedance corrector 2 (represented only diagrammatically in the drawing) followed by a phase shifter consisting of a coupler containing two pistons. The incident waves arriving from the magnetron 3 arrive perpendicularly at the inlet and outlet faces of the material being treated. These faces consist of two screens 4, 5 made of a dielectric substance, particularly teflon, each screen forming a cross section of the tube, perpendicular to its axis. Between them the two screens form a middle section 6 of the tube, which acts as a receptacle for the material.

Two pistons 7 and 8 slide back and forth near the ends of the tube 1. Each piston has a piston rod 9, 10. The two piston rods are connected mechanically to a lever 11 which is given a reciprocating movement by a crank or eccentric 12. The two piston rods are connected together through telescopic tubes 13 which have radial holes in which a pin 14 can be inserted. The arrangement serves to adjust the effective length of the telescopic tubes 13 and so adjust the distance between the working faces 15 and 16 of pistons 7 and 8. The working faces 15 and 16 of the two pistons are circular and metallized. They face towards the middle of the tube 1. The faces 15 and 16 are perpendicular to the axis X, X' of the tube 1.

The piston 7 is connected rigidly through the lever 11 to a further piston 17, which slides back and forth in a second waveguide parallel to the first. The other end of the second waveguide is connected to the magnetron 3 through the impedance corrector. The pistons 7 and 17 are staggered in longitudinal position, relative to each other, by a longitudinal distance $\lambda/4$. The circuit acts as a perfect phase shifter, that is to say:

a wave emitted by the magnetron 3 is transmitted by the tube without attenuation, and there is no reflected wave, on the other hand a wave entering the tube 1 is transmitted without being attenuated, and without any fraction of the wave being reflected, As a stationary state becomes established in the tube, because an impedance Z has been installed, the same system of stationary waves appears in the inlet branch, just as though the impedance Z were connected to it.

If the two pistons are displaced simultaneously (the stagger distance remaining the same) this is equivalent to moving the impedance Z closer or further away.

When the device is in operation, the movements of the two pistons exactly compensate the displacement of the short-circuit 16, because displacing the mirror 16 means moving the impedance which it represents closer or further away.

A source of air 18 allows polluted air to be sent through the tube 1 in the direction of the arrow F, the air passing over a cartridge 19 containing a molecular adsorbent screen. During the adsorption stage of the process the impurities in the current of air are adsorbed by the screen 19, which is situated between the piston faces 15 and 16 and the internal wall of the tube 1. During this stage the magnetron 3 is inoperative and the pistons 7 and 8 are stationary.

When it is desired to regenerate the screen 19, the feed of air is shut off and the magnetron 3 is switched on. The crank 12 is started up, giving the lever 11 a reciprocating movement, which is transmitted to the short-circuit devices 15 and 16, the reciprocating movement being longitudinal and parallel to the axis X, X' of the tube 1. The electrical distance between the inlet of the impedance corrector and the piston face 16, taking into consideration the fractional reflections from the piston faces 15 and 17, always stays the same, this electrical distance being 5 times the wavelength of the guide 1. The distance between the piston faces 15 and 17 also remains the same. For a hybrid 3 db coupler of the kind used this distance is ¼ of the wavelength in the waveguide. The distances between the piston face 16 and the screen 5 and between the piston face 15 and the screen 4 vary periodically. The impedance corrector adjusts the pistons automatically, so that the energy reflected remains zero all through the treatment. Regeneration is more effective than it is in the conventional reactors. The internal electric field is greater than what would be available if the applicator were not to function resonantly.

We claim:

1. An applictor comprising:
    a generator of microwaves, said microwaves having a mode of propagation and a wavelength,
    an enclosure for receiving material to be treated,
    a coupler coupling the generator and the enclosure so that the generator delivers microwave energy distributed in resonance for said mode of propagation in a given direction,
    a first short-circuit device situated at one end of said enclosure with respect to said direction,
    a device for displacing the first short-circuit device by a reciprocating movement in said direction, and
    means for maintaining the resonance in spite of the displacements of the first short-circuit device.

2. The applicator of claim 1 wherein said means for maintaining the resonance comprise a phase-shifter with first and second conjugated branches and third and fourth conjugated branches, the first branch being coupled to the generator, the second branch being coupled to the enclosure and the third and fourth branches containing respectively two short-circuits in staggered position relative to each other by ¼ of the wavelength, the device for displacing the short-circuit devices simultaneously displacing said short-circuits over a same distance.

* * * * *